Dec. 6, 1927.
S. OSTERMAN
1,651,726
BATTERY CONNECTION
Filed March 21, 1927
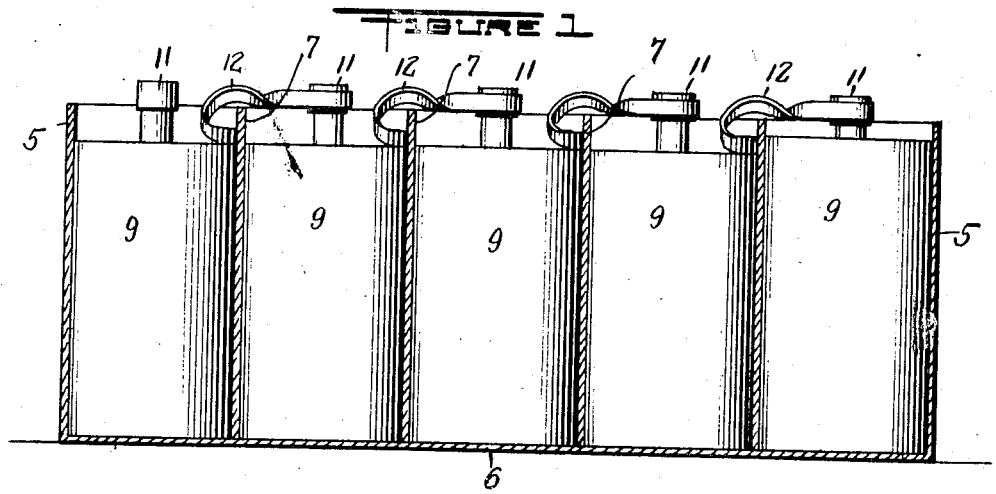
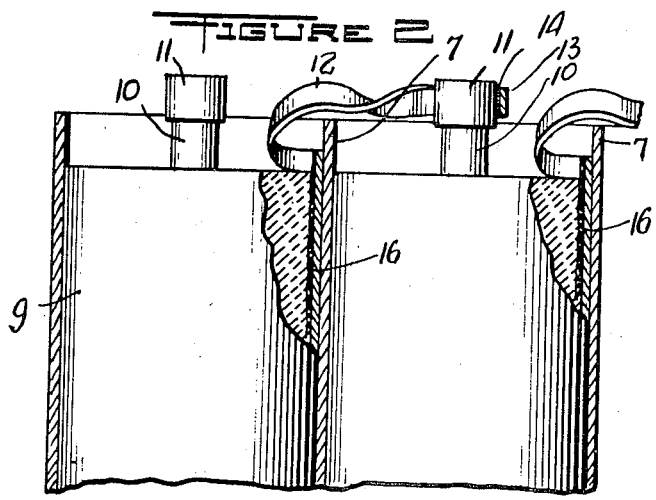
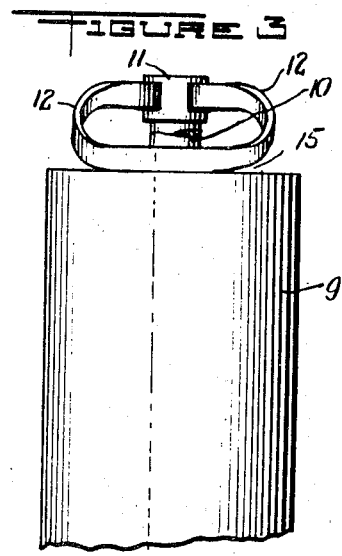
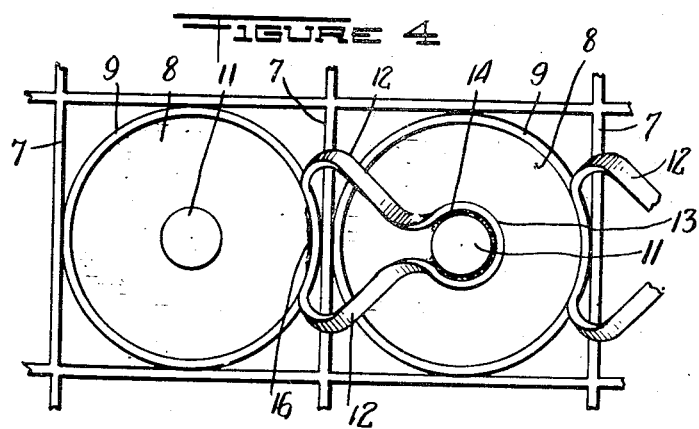
INVENTOR
Samuel Osterman
BY Walton Harrison
ATTORNEY Patented Dec. 6, 1927.

1,651,726

UNITED STATES PATENT OFFICE.

SAMUEL OSTERMAN, OF NEW YORK, N. Y.

BATTERY CONNECTION.

Application filed March 21, 1927. Serial No. 176,999.

My invention relates to battery connections of the kind used for connecting one pole of each battery cell with a pole of opposite sign of the next successive battery cell, and thus for connecting battery cells together, usually in series.

My invention is adapted for service upon batteries of many different kinds, but is of peculiar use for B batteries for radio work, and for small dry batteries and small primary batteries of various kinds.

Reference is made to the accompanying drawing forming a part of this specification, and in which like reference characters indicate like parts throughout the several figures.

Figure 1 is a longitudinal vertical section through a portion of a B battery provided with my improved battery connection.

Figure 2 is a fragmentary section somewhat like Figure 1 but upon a larger scale, certain portions being broken away.

Figure 3 is an end elevation of the mechanism appearing in Figure 2; and

Figure 4 is a fragmentary plan of the same.

A battery casing 5, made of insulating material in sheet form, provided with a bottom 6 and with a number of partitions 7, having thus a general cellular form, carries the battery cells 8.

Each battery cell has a container 9 carrying the other parts, this container being the anode of the cell, and usually made of zinc.

Each cell is also provided with a cathode 10, in the form of a rod of gas carbon, graphite or the like, or of metal as the case may be, and carrying a cap 11 of brass or other appropriate metal.

Each battery cell is provided with my improved connecting strip 12, which is integral with the cylindrical container 9 and formed as hereinafter more fully described.

Each connecting strip 12 is provided with a portion 13 bent into the form of an eye, as indicated more particularly in Figure 4, and almost but not quite encircling the cap 11 of the next successive cell. The portion 13 of the connecting strip is fastened securely to the cap 11 by a solder joint 14, as indicated in Figure 4. In practice, the portion 13 is bent tightly around the cap 11 and held tightly while the solder is being applied, the surfaces thus united by the solder having been previously treated with an appropriate paste serving as a flux.

The manner in which the connecting strip 12 is formed is as follows: First, I cut a slot 15 around the top of the container as indicated in Figure 3, the slot extending at least four-fifths of the way around. This leaves the strip 12 integral with the container, and in such form as to admit of its being readily bent. The strip 12 is next bent over, as indicated, so as to bring its portion 13 directly around the cap 11 of the next successive cell, to which it is then soldered, as above described.

Each container 9, as usually constructed, is provided with a seam 16, due to the use of solder in uniting the edges of the container; or in other words, in forming it into a cylinder. I preferably cut the slot 15 so that it extends to points adjacent the seam 16, as may be understood from Figure 4. Thus the formation of the connecting strip 12 does not disturb the seam 16, and the additional thickness of metal, due to the use of this seam, is useful in lowering the ohmic resistance of that part of the container immediately adjacent the connecting strip.

By this arrangement, the connecting strip is so located that by its use the internal resistance of the battery as a whole, is somewhat reduced.

Since the connecting strip 12 is not entirely severed from the metallic container from which it is formed, but remains integral therewith, this gives the best possible metallic communication between the connecting strip 12 and the container wherefrom it is formed.

Since the portion 15 of each connecting strip is stretched tightly around the cap 11 with which it is to be connected, and is soldered thereto in the manner above described, a perfect joint having a minimum ohmic resistance is thus formed between the connecting strip 12 of one cell and the cathode 10 of the next successive step.

It will be noted that the portion 13 of each connecting strip 12, being flat and pliable, is of ideal form to be stretched around the cap and soldered as above described.

It will also be noted that with the connections thus made, the cylindrical anode of each cell is in communication with the cathode of the next successive cell by means of two separate metallic paths, namely, the two halves of the connecting strip as a whole, as may be understood from Figures 3 and 4.

I do not limit myself to the precise mechanism here illustrated and above described, as variations therein may be made without departing from my invention, the scope of which is commensurate with my claims.

Having thus described my invention, what I claim as new and desire to secure by Letters Patent is as follows:

1. In a device of the character described, a plurality of battery cells each provided with an anode and a cathode, each anode having substantially the form of a cylinder and provided with an endless strip partially but not completely severed therefrom and thus left integral therewith, said strip being connected with the cathode of the next successive cell, said strip because of its being endless, presenting two metallic paths of communication between two adjacent cells.

2. A device of the character described comprising a battery cell provided with a containing vessel of sheet metal serving as an anode and provided with a solder seam, said containing vessel being provided with an endless strip partially but not completely severed from it, and means for connecting said strip with a portion of another battery cell so as to afford two distinct paths of communication between the two cells.

3. A battery cell comprising a cathode and an anode, said anode being made of sheet metal and shaped to serve as a containing vessel, said anode being provided with a metallic conducting strip integral with it and partially but not completely severed from it, said strip being endless in order to provide two conducting paths, as and for the purposes set forth.

Signed at New York city, in the county of Bronx and State of New York, this 19th day of March, 1927.

SAMUEL OSTERMAN.